United States Patent [19]

Wallace

[11] 4,190,100

[45] Feb. 26, 1980

[54] INTERNAL HEAT EXCHANGER FOR MEAT

[75] Inventor: Charles H. Wallace, Carrollton, Va.

[73] Assignee: International Telephone and Telegraph Corporation, New York, N.Y.

[21] Appl. No.: 889,711

[22] Filed: Mar. 24, 1978

[51] Int. Cl.² .............................................. F25B 29/00
[52] U.S. Cl. ..................................... 165/48 R; 17/51; 62/62; 99/533; 165/142
[58] Field of Search .......................... 17/42.1, 51, 48; 165/142, 185; 99/532, 533; 62/62, 293

[56] References Cited

U.S. PATENT DOCUMENTS

| | | | |
|---|---|---|---|
| 402,736 | 5/1889 | Holgate | 62/62 |
| 612,817 | 10/1898 | Brittin et al. | 62/62 |
| 1,485,253 | 2/1924 | Devlin | 17/42.1 |
| 1,780,267 | 11/1930 | Malone | 99/532 X |
| 2,672,032 | 3/1954 | Towse | 165/142 X |
| 2,835,480 | 5/1958 | Perez | 62/62 X |
| 3,035,508 | 5/1962 | Nelson | 99/532 X |
| 3,485,060 | 12/1969 | Ziegler | 62/293 X |
| 3,664,344 | 5/1972 | Bryne | 62/293 X |

FOREIGN PATENT DOCUMENTS 254462 12/1912 Fed. Rep. of Germany ........... 165/142

Primary Examiner—Samuel Scott
Assistant Examiner—Margaret A. Focarino
Attorney, Agent, or Firm—John T. O'Halloran; Alfred C. Hill

[57] ABSTRACT

The heat exchanger is provided with a plurality of recirculating needles each having an outer tube having one end thereof terminated in a closed needle point and an inner tube disposed within the outer tube having one end thereof spaced from the needle point and providing a predetermined clearance along its length between the outer wall of the inner tube and the inner wall of the outer tube. The clearance of each needle is in communication with a pressurized heat transferring medium supply manifold and the inner tube is in communication with a discharge and return manifold. The clearance and inner tube of each needle provides a needle that circulates the pressurized heat transferring medium therethrough. The pressurized heat transferring medium may be hot to heat the meat into which the needles are inserted, or the pressurized heat transferring medium may be cold to chill the meat into which the needles are inserted.

24 Claims, 7 Drawing Figures

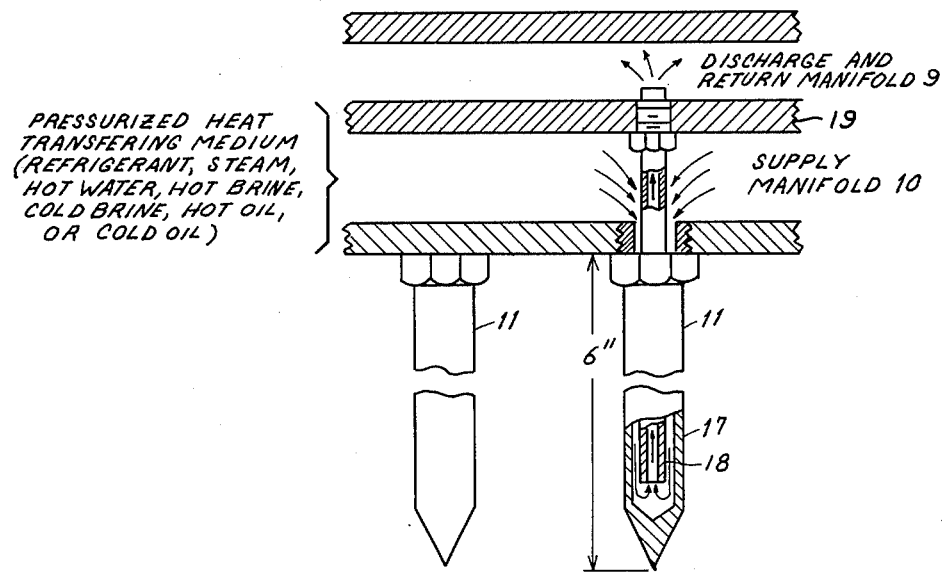
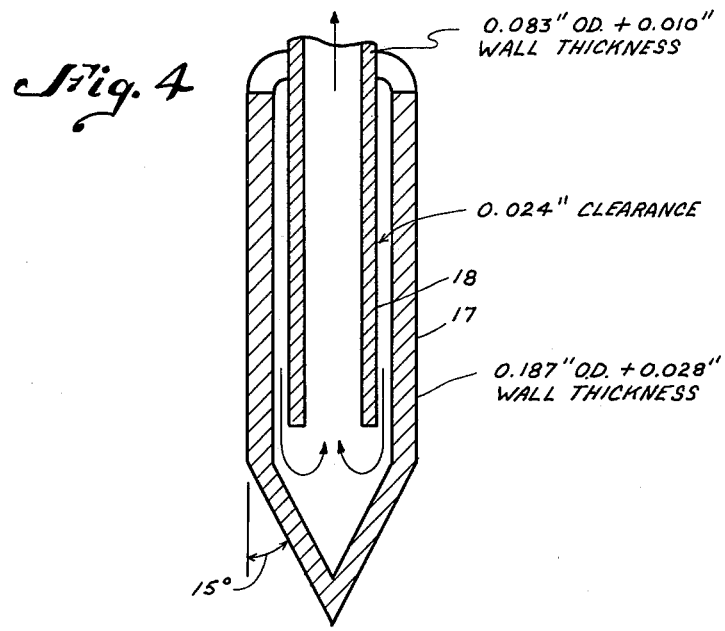

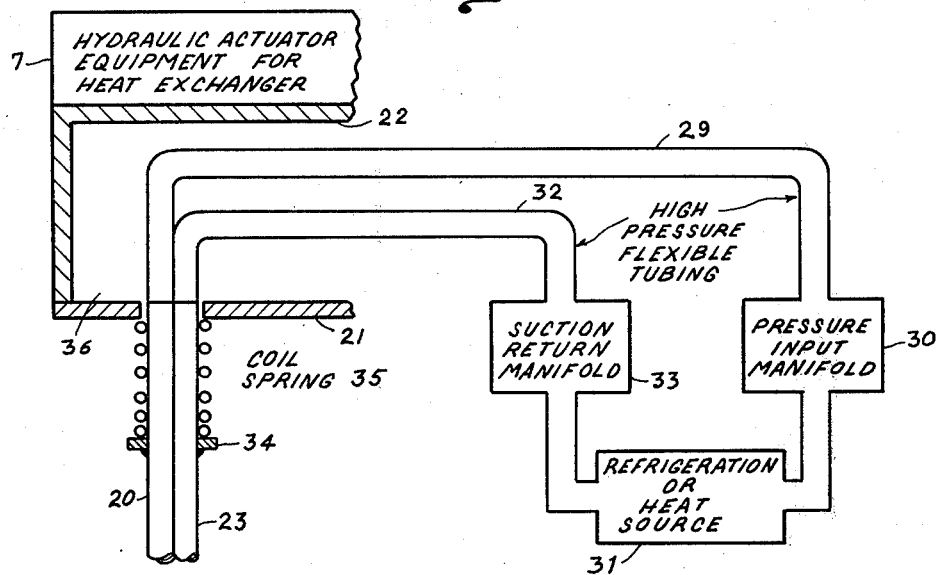
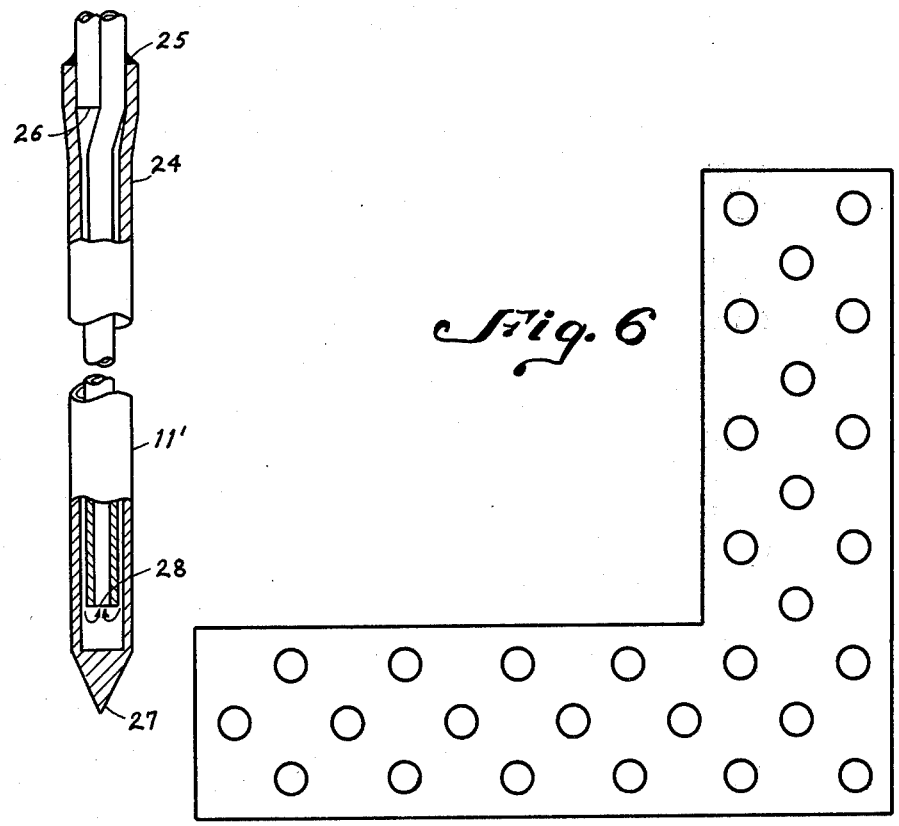

INTERNAL HEAT EXCHANGER FOR MEAT

BACKGROUND OF THE INVENTION

The present invention relates to apparatus for processing animals for human consumption and more specifically to apparatus for chilling or heating the dressed carcasses.

The usual procedure for reducing the temperature of a freshly slaughtered animal from a normal body temperature of 95° F. to 100° F. is to support the dressed beef carcass, dressed hog carcass, dressed lamb carcass, etc. on a trolley with a gambrel to spread the legs and roll this carcass on an overhead rail system into a refrigerator in which a rapid circulation of chilled air is recirculated over the surface of the carcasses, until the surface temperature equilibrates with the inner temperature, or until the temperature of the heaviest muscle is reduced to 38° F. at bone joint in the center of the muscle.

The ham is the thickest muscle on the hog and the time required by the conventional method is from 16 to 20 hours. The practical time is 24 hours as the work force in the killing department start at 6:00 A.M. and hogs would be ready to cut at 2:00 A.M. The cutting department must be supported by the curing department, pork packing department, etc. Due to labor resisting a 2:00 A.M. start, it has become a practice to start the cutting department at the same time as the killing department so that the coolers will be emptied to make room for the hot hogs coming from the kill. Therefore, the practical time is 24 hours.

The normal average shrinkage is 2% moisture loss in this prior art method of chilling. It is possible and practical to cut the ham off hot and eliminate the chilling process entirely from this cut which is 25% of the live purchased weight. Energy is expended, 2% shrinkage and 24 hours chilling from 100° F. to 38° F. and immediately cooking to temperatures varying with the type of hams, but ranging from 152° F. to 165° F. and then chilling the product back to 38° F.

The usual time to smoke and cook hams, bone in, is about 12 hours in a conventional smokehouse.

SUMMARY OF THE INVENTION

An object of the present invention is to reduce the time required for chilling the meat of the carcass from 95° F. to 100° F. to 38° F. to a period of 15 minutes without shrinkage.

Another object of the present invention is to recirculate a refrigerant or a heated solution through recirculating needles to either chill or cook a heavy muscled animal without actually injecting the refrigerant or heat solution into the meat.

A further object of the present invention is to start with a 100° F. product and combining the injection pumping of hot brine through the recirculating needles and raising the temperature using a heated medium in the recirculating needles to raise the temperature to 126° F. before going into the smokehouse. A 15 pound ham, bone in, would be smoked up to a temperature of 165° F. in 4 hours, which would be one-third of the conventional time of the prior art arrangement or would increase the capacity of existing smokehouses by three times the current capacity.

A feature of the present invention is the provision of an internal heat exchanger for meat comprising: at least one recirculating needle including an outer tube having one end thereof terminated in a closed needle point; and an inner tube disposed within the outer tube having one open end thereof spaced from the needle point and providing a predetermined clearance along its length between the outer wall of the inner tube and the inner wall of the outer tube.

Besides providing a cooling or heating heat exchanger, the action of the multiple injections of the plurality of recirculating needles brings about a release of salt soluble protein which forms a natural binder to bond the boneless ham during the final cooking stages. In the past this has been accomplished by tumblers to bring about this exude, and slow moving agitators also have been used.

Therefore, the heat exchanger with its plurality of recirculating needles has an added advantage in that there is accomplished a dual function of heating and protein release. The agitator concept requires 24 hours. In another prior art arrangement the surface of boneless hams have been masticated to release the protein exuded. This is accomplished in a short time span but the results are not as effective as the massaging action of the recirculating needle injection of the present invention.

BRIEF DESCRIPTION OF THE DRAWING

Above-mentioned and other features and objects of this invention will become more apparent by reference to the following description taken in conjunction with the accompanying drawing, in which:

FIG. 3 is a cross-sectional view of one of the recirculating needles associated with the supply manifold and discharge and return manifold of the heat exchanger of FIG. 2;

FIG. 4 is an enlarged detailed illustration of one of the recirculating needles of FIG. 3 in accordance with the principles of the present invention;

FIGS. 5 and 6 illustrate, as an example, two different patterns for the needles of the heat exchanger in accordance with the principles of the present invention; and FIG. 7 is a schematic diagram of a retractable spring loaded needle for cooling or heating meat cuts and carcasses with bone-in in accordance with the principles of the present invention.

DESCRIPTION OF THE PREFERRED EMBODIMENTS

Figure 1:
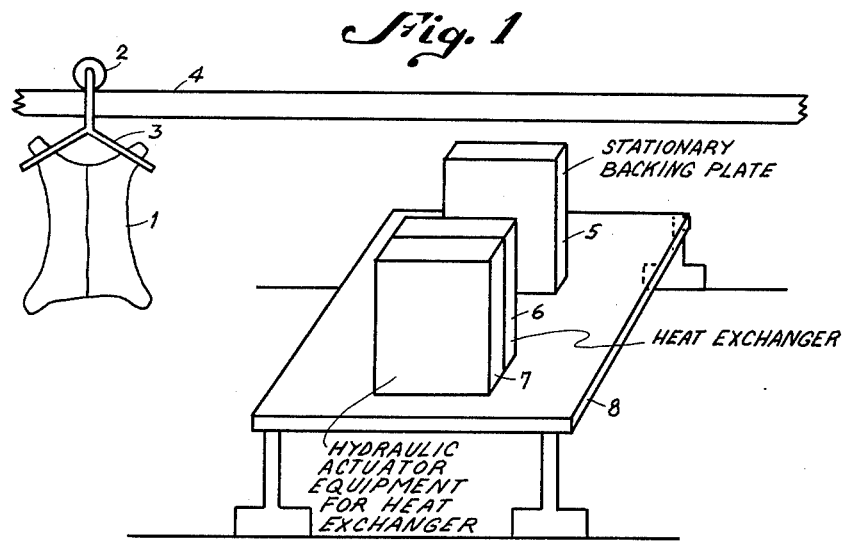
FIG. 1 is a schematic perspective view of a chilling or heating station in a meat processing plant.

The dressed carcass 1 to be chilled or heated enters the heat exchanger station on a trolley 2 with a gambrel 3 which is rolled on an overhead rail system 4 into a position between a stationary backing plate 5, the heat exchanger 6 of the present invention, operated by, for example, hydraulic actuator equipment 7. Backing plate 5, heat exchanger 6 and actuator equipment 7 are supported on a table 8 having the correct height to enable the injection of the recirculating needles of the heat exchanger 6 into carcass 1 by the actuator equipment 7 with the carcass being held in position for this injection of the recirculating needles of heat exchanger 6 by the stationary backing plate 5.

Figure 2:
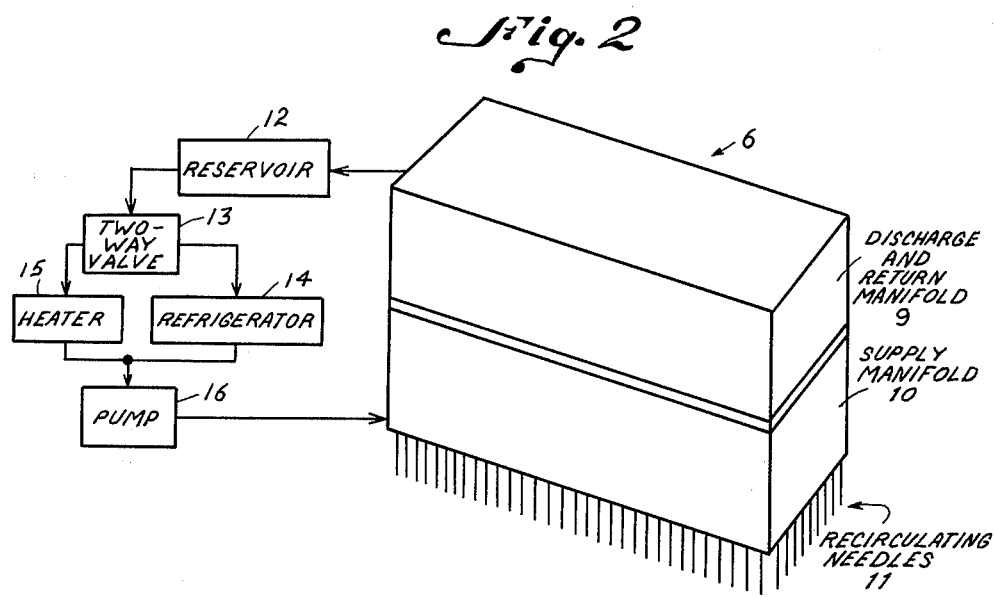
FIG. 2 is a perspective view of the heat exchanger in accordance with the principles of the present invention.

Referring to FIGS. 2 and 3, the heat exchanger 6 includes a discharge and return manifold 9, a supply manifold 10 and a plurality of recirculating needles 11. The discharge and return manifold 9 is connected to a reservoir 12 by conventional piping and hence to a two-way valve 13. Two-way valve 13 controls the flow of the fluid from reservoir 12 to either a refrigerator 14 or a heater 15 to maintain the temperature of either a refrigerant or a heating solution that is present in reservoir 12 depending upon whether the heat exchanger is to chill a meat product or to heat a meat product. The pump 16 is connected to refrigerator 14 and heater 15 to supply the pressurized heat transferring medium to the supply manifold 10 and, hence, into the recirculating needles 11.

Figure 5:
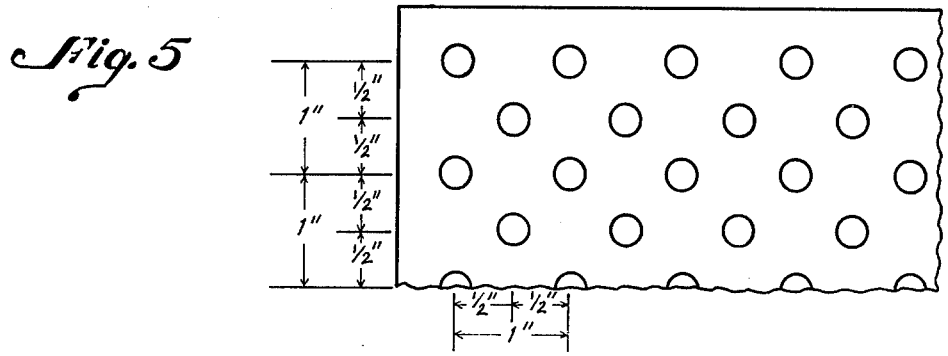

Supply manifold 10 has a plurality of apertures therein which may take the form of the needle patterns shown in FIGS. 5 and 6 into which the outer tube 17 is threaded, while the inner tube 18 is passed through a partition 19 between supply manifold 10 and discharge and return manifold 9 into the discharge and return manifold 9. As can be seen from the illustration of FIG. 3, the pressurized heat transferring medium passes through the clearance between the inner and outer tubes 17 and 18, respectively, down to a pointed end of recirculating needle 11 and then back up through the inner tube 18 to manifold 9.

As shown in greater detail in FIG. 4, the outer diameter of the recirculating needles are very small so that they do not leave large holes where they are injected into the meat product. Typical dimensions of the inner and outer tubes 17 and 18, the clearance between tubes 17 and 18 and the angle of the point of the needle are shown on FIG. 4.

The heat exchanger thus far described is for use with boneless primal cuts or meat products. If this heat exchanger were used with bone-in cuts, whole carcasses or half carcasses, when a recirculating needle hit a bone the needles of the heat exchanger would be prevented from penetrating the muscle to obtain the desired chilling or heating. To overcome this the recirculating needles would be retractable spring loaded recirculating needles as schematically illustrated in FIG. 7.

Referring to FIG. 7 there is illustrated one of a plurality of retractable spring loaded recirculating needles which would be used to chill or heat bone-in meat products, such as primal cuts, whole carcasses or half carcasses. The retractable spring loaded recirculating needles include a pressure input tube 20 extending through a support member 21 having a portion 22 upon which the hydraulic actuator equipment 7 operates. In addition there is provided a suction return tube 23 also extending through the support member 21. Tubes 20 and 23 are coupled to a recirculating needle 11' by a sleeve 24 which is in a pressure tight sealed relationship with tubes 20 and 23 at point 25. Input tube 20 terminates at point 26 within sleeve 24 below the sealed point 25. Sleeve 24 is elongated as illustrated and terminates in a closed needle point 27. Return tube 23 extends coaxially of sleeve 24 to a point 28 adjacent needle point 27. Thus, a clearance for passing the pressurized heat transferring medium is provided between the outer wall of return tube 23 and the inner surface of sleeve 24. The pressurized heat transferring medium is returned by return tube 23. A high pressure flexible tubing 29 is connected between input tube 20 and pressure input manifold 30 which receives a cooled or hot heat transferring medium from source 31 depending upon whether a chilling or heating operation is in process. A high pressure flexible tubing 32 is connected between return tube 23 and suction return manifold 33. A retaining member 34 surrounds and is secured to tubes 20 and 23 in spaced relation from support member 21. A coil spring 35 surrounds tubes 20 and 23 disposed between support member 21 and retaining member 34.

When a needle 11' hits a bone, needle 11' and tubes 20 and 23 retract so that tubes extend into chamber 36, this being possible due to flexible tubings 29 and 32. This retraction compresses spring 35 and permits those needles that do not encounter a bone to penetrate the muscles surrounding the bone. Upon removal of the needles 11' from the bone-in meat product, the needles that have retracted will be returned to their normal position by spring 35.

In both the fixed and retractable spring loaded recirculating needle heat exchangers the product to be chilled or heated would be conveyorized handled with dwell time and multiple insertions would be made to improve on heat transfer. For example, if the recirculating needles are on one inch centers, the needles would be inserted, dwell time for cooling or heating would take place for about 15 minutes, the needles would be removed and the conveyed product would be moved one half an inch and another needle insertion would be made. With several such needle insertions and conveyor movement there will be achieved contact chilling or heating on practically all meat tissue.

While I have described above the principles of my invention in connection with specific apparatus it is to be clearly understood that this description is made only by way of example and not as a limitation to the scope of my invention as set forth in the objects thereof and in the accompanying claims.

I claim:

1. An internal heat exchanger for meat comprising:
    a plurality of recirculating needles disposed in a predetermined pattern, each of said plurality of needles including
        an outer tube having one end thereof terminated in a closed needle point, and
        an inner tube disposed within said outer tube having one open end thereof spaced from said needle point and providing a predetermined clearance along its length between the outer wall of said inner tube and the inner wall of said outer tube;
    an input manifold common to said predetermined clearance of each of said plurality of needles to supply a pressurized heat transferring medium to each of said plurality of needles; and
    a return manifold common to said inner tube of each of said plurality of needles to remove said heat transferring medium from each of said plurality of needles.

2. An exchanger according to claim 1, wherein said predetermined clearance and said inner tube of each of said plurality of needles circulate said heat transferring medium through each of said plurality of needles.

3. An exchanger according to claim 1, wherein said heat transferring medium is hot to heat said meat into which said recirculating needles are inserted.

4. An exchanger according to claim 1, wherein said heat transferring medium is cold to cool said meat into which said recirculating needles are inserted.

5. An exchanger according to claim 1, wherein said plurality of needles are equal to more than two.

6. An exchanger according to claim 1, wherein said input manifold and said return manifold includes a first member disposed transverse to each of said plurality of needles, to which the other end of said outer tube of each of said plurality of needles is secured, a second member disposed parallel to and spaced from said first member to which the other open end of said inner tube of each of said plurality of needles is secured, a third member disposed parallel to and spaced from said second member and said other open end of said inner tube of each of said plurality of needles, the space between said first and second members being in communication with said predetermined clearance of each of said plurality of needles and providing said input manifold, and the space between said second and third members being in communication with said inner tube of each of said plurality of needles and providing said return manifold.

7. An exchanger according to claim 6, further including actuating means engaging said third member to force said plurality of needles into said meat.

8. An exchanger according to claim 7, wherein said actuating means includes a hydraulic actuator.

9. An exchanger according to claim 1, further including actuating means engaging the outer surface of said return manifold to force said plurality of needles into said meat.

10. An exchanger according to claim 9, wherein said actuating means includes a hydraulic actuator.

11. An exchanger according to claim 1, wherein each of said plurality of needles is a retractable spring loaded recirculating needle.

12. An exchanger according to claim 11, wherein each of said retractable spring loaded needles include a pressure input tube extending through a support member, a suction return tube extending through said support member, a retaining member surrounding and secured to said input tube and said return tube spaced from said support member, a coil spring surrounding said input tube and said return tube disposed between said support member and said retaining member, an elongated sleeve sealed in a pressure tight relationship to said input tube and said return tube, said input tube terminating inside the seal of said sealed sleeve, said sleeve terminating in a closed needle point and said return tube extending coaxial of said sleeve to a point adjacent said needle point, said predetermined clearance being disposed between the outer wall of said return tube and the inner wall of said sleeve, a first high pressure flexible tubing connected between said input tube adjacent said support member and said pressure input manifold, and a second high pressure flexible tubing connected between said return tube adjacent said support member and said suction return manifold.

13. An internal heat exchanger for meat comprising:
at least one retractable spring loaded recirculating needle including a pressure input tube extending through a support member, a suction return tube extending through said support member, a retaining member surrounding and secured to said input tube and said return tube spaced from said support member, a coil spring surrounding said input tube and said return tube disposed between said support member and said retaining member, an elongated sleeve sealed in a pressure tight relationship to said input tube and said return tube, said input tube terminating inside the seal of said sealed sleeve, said sleeve terminating in a closed needle point and said return tube extending coaxial of said sleeve to a point adjacent said needle point and providing a predetermined clearance along its length between the outer wall of said return tube and the inner wall of said sleeve, a first high pressure flexible tubing connected between said input tube adjacent said support member and a pressure input manifold, and a second high pressure flexible tubing connected between said return tube adjacent said support member and a suction return manifold.

14. An exchanger according to claim 13, wherein said input manifold supplies a pressurized heat transferring medium to said first flexible tubing.

15. An exchanger according to claim 14, wherein said return manifold removes said heat transferring medium from said second flexible tubing.

16. An exchanger according to claim 15, wherein said heat transferring medium is hot to heat said meat into which said recirculating needle is inserted.

17. An exchanger according to claim 15, wherein said heat transferring medium is cold to cool said meat into which said recirculating needle is inserted.

18. An exchanger according to claim 15, wherein said predetermined clearance and said return tube circulates said heat transferring medium through said needle.

19. An internal heat exchanger for meat comprising:
a plurality of retractable spring loaded needles each including a pressure input tube extending through a support member, a suction return tube extending through said support member, a retaining member surrounding and secured to said input tube and said return tube spaced from said support member, a coil spring surrounding said input tube and said return tube disposed between said support member and said retaining member, an elongated sleeve sealed in a pressure tight relationship to said input tube and said return tube, said input tube terminating inside the seal of said sealed sleeve, said sleeve terminating in a closed needle point and said return tube extending coaxial of said sleeve to a point adjacent said needle point, said predetermined clearance being disposed between the outer wall of said return tube and the inner wall of said sleeve, a first high pressure flexible tubing connected between said input tube adjacent said support member and a pressure input manifold, and a second high pressure flexible tubing connected between said return tube adjacent said support member and a suction return manifold.

20. An exchanger according to claim 19, wherein said input manifold supplies a pressurized heat transferring medium to each of said first flexible tubings.

21. An exchanger according to claim 20, wherein said return manifold removes said heat transferring medium from each of said second flexible tubings.

22. An exchanger according to claim 21, wherein said heat transferring medium is hot to heat said meat into which said plurality of needles are inserted.

23. An exchanger according to claim 21, wherein said heat transferring medium is cold to chill said meat into which said plurality of needles are inserted.

24. An exchanger according to claim 21, wherein said predetermined clearance and said return tube of each of a plurality of recirculating needles circulate said heat transferring medium through each of said plurality of needles.

* * * * *